UNITED STATES PATENT OFFICE.

PROSPER MONNET, OF LYONS, FRANCE.

PROCESS OF MAKING TOLUENESULFOCHLORIDS.

SPECIFICATION forming part of Letters Patent No. 551,131, dated December 10, 1895.

Application filed May 3, 1895. Serial No. 547,968. (No specimens.)

*To all whom it may concern:*

Be it known that I, PROSPER MONNET, a citizen of the Republic of France, residing at Lyons, France, have invented certain Improvements in the Manufacture of Toluenesulfochlorids from Toluene, of which the following is a specification.

My invention relates to improvements in the manufacture of toluenesulfochlorids that facilitate and cheapen the production of the liquid toluenesulfochlorid known as "ortho-toluenesulfochlorid," which is employed in the manufacture of the sweetening agent used in the arts and in medicine under the name of "saccharin."

The manufacturing process employed up to the present time for preparing toluenesulfochlorids is a most tedious and indirect one, involving a large expenditure of time and a very great loss of material and furnishing a comparatively small yield of liquid ortho-toluenesulfonic chlorid, and hence considerably increasing the cost of the final product. It consists of at least five distinct stages or operations, commencing with the formation of toluenesulfonic acids by the action of sulfuric acid on toluene and conversion of the free toluenesulfonic acids into the corresponding calcium salts by neutralization with chalk. These calcium salts then require to be converted into the corresponding sodium or potassium salts by treatment with carbonates of the alkalies. The resulting sodium or potassium toluenesulfonates must be perfectly dried and then converted into the toluenesulfonic chlorids by treatment with phosphorus pentachlorid in a specially-constructed apparatus.

The object of this invention is to provide a process by which liquid toluenesulfochlorid can be prepared direct from toluene on a large scale for technical purposes without the loss of time and material and use of extensive plant involved in the foregoing operations, and for this purpose chlorsulfonic acid, which is obtainable in any quantity by the combination of anhydrous sulfuric and hydrochloric acids, has been found a suitable reagent. Under ordinary conditions the action of chlorsulfonic acid on toluene is of a very violent character and different products are obtained, according to the conditions prevailing. Claesson & Wallin (*Berichte der Deutschen Chemischen Gesellschaft*, XII, 1848) found that under certain specified conditions one half of the toluene used was converted into sulfochlorids consisting of liquid and solid modifications, while the rest consisted of toluenesulfonic acids and other substances, so that the cost of production of the liquid toluenesulfochlorid by this process would have been relatively higher than the older and indirect method.

By my improved process the action of chlorsulfonic acid on toluene is so regulated that the whole of the toluene is in one operation, and without the simultaneous production of other organic substances, converted into a mixture of toluenesulfochlorids from which about sixty per cent. of the theoretical yield of liquid toluenesulfochlorid can be readily separated in a sufficiently pure state for technical purposes. In order to produce this novel effect, it is necessary that the temperature of the reacting mass is maintained between the limits of 0° and 5° centigrade during the whole of the operation, and that a large excess of chlorsulfonic acid is employed. Under these conditions a very large yield of liquid toluenesulfochlorid is obtained direct from toluene with a considerable economy of time, plant, labor, and material.

Having thus described the nature and advantages of my improvements, I shall now proceed to describe how the invention is carried out.

Four hundred kilos chlorsulfonic acid are cooled to 0° centigrade and one hundred kilos toluene run slowly in with constant stirring, the temperature of the mass never being allowed to rise above 5° centigrade. When all the toluene has been added, the mass is still constantly stirred for twelve hours until the reaction is complete. The resulting mass is then poured over ice, whereby the excess of chlorsulfonic acid is decomposed, and the toluenesulfochlorids separate as an oily, partly congealed, liquid. The oily layer, decanted from the melted ice, corresponds to the theoretical yield of toluenesulfochlorids expressed by the equation:

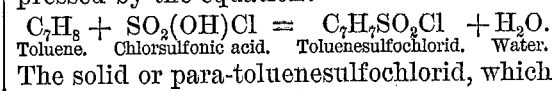
$$\underset{\text{Toluene.}}{C_7H_8} + \underset{\text{Chlorsulfonic acid.}}{SO_2(OH)Cl} = \underset{\text{Toluenesulfochlorid.}}{C_7H_7SO_2Cl} + \underset{\text{Water.}}{H_2O}.$$

The solid or para-toluenesulfochlorid, which is valueless for the purpose required, is separated from the liquid toluenesulfochlorid by cooling the mass to −20° centigrade for twelve hours, and filtering off the crystallized toluenesulfochlorid. The liquid toluenesulfochlorid, retreated in the same way until no more solid is deposited and washed with water to remove adherent acids, amounts to sixty per cent. of the mixed toluenesulfochlorids and is sufficiently pure for technical purposes.

Having thus described my invention, I claim as new and desire to secure by Letters Patent—

1. The process of manufacturing liquid or ortho-toluenesulfochlorid by the direct action of chlorsulfonic acid on toluene at a temperature not exceeding 5° centigrade nor below 0° centigrade in the presence of a large excess of chlorsulfonic acid, which is kept constantly agitated until the whole of the toluene has been converted into toluenesulfochlorids.

2. The hereinbefore described process of manufacturing liquid or ortho toluenesulfochlorid consisting in taking chlorsulfonic acid, cooling the same to 0° centigrade; running slowly into the cooled acid toluene while constantly stirring or agitating the mass; maintaining the temperature below 5° centigrade; stirring or agitating the mass until the reaction is complete, cooling the resultant mass to decompose the excess of chlorsulfonic acid and separate the toluenesulfochlorids into an oily partly congealed liquid; decanting the oily layer, and separating the para-toluenesulfochlorid and filtering the crystallized toluenesulfochlorid.

In testimony whereof I have signed my name to this specification in the presence of two subscribing witnesses.

PROSPER MONNET.

Witnesses:
   A. GINIARA,
   GUSTAV PERTSOL.